US008922759B2

(12) United States Patent
Gassert et al.

(10) Patent No.: US 8,922,759 B2
(45) Date of Patent: Dec. 30, 2014

(54) WHITE CANE WITH INTEGRATED ELECTRONIC TRAVEL AID USING 3D TOF SENSOR

(71) Applicant: MESA Imaging AG, Zurich (CH)

(72) Inventors: Roger Gassert, Wetzikon (CH); Yeongmi Kim, Donghae-si (KR); Thierry Oggier, Zurich (CH); Markus Riesch, Zurich (CH); Mathias Deschler, Zurich (CH); Cornelia Prott, Zurich (CH); Stefan Beat Schneller, Solothurn (CH); Vincent Hayward, Paris (FR)

(73) Assignee: MESA Imaging AG, Zurich (CH)

( * ) Notice: Subject to any disclaimer, the term of this patent is extended or adjusted under 35 U.S.C. 154(b) by 0 days.

(21) Appl. No.: 13/848,884

(22) Filed: Mar. 22, 2013

(65) Prior Publication Data

US 2013/0220392 A1 Aug. 29, 2013

Related U.S. Application Data

(63) Continuation of application No. PCT/US2011/053260, filed on Sep. 26, 2011.

(60) Provisional application No. 61/386,190, filed on Sep. 24, 2010.

(51) Int. Cl.

| | |
|---|---|
| ***G01C 3/08*** | (2006.01) |
| ***A45B 3/08*** | (2006.01) |
| ***A61H 3/06*** | (2006.01) |

(52) U.S. Cl.

CPC *A61H 3/061* (2013.01); *A45B 3/08* (2013.01); *A61H 3/068* (2013.01); *A61H 2003/063* (2013.01); *A61H 2201/5092* (2013.01); *A61H 2201/5058* (2013.01); *A61H 2003/065* (2013.01)

USPC .......... 356/5.01; 356/3.01; 356/4.01; 356/5.1

(58) Field of Classification Search

USPC .................... 356/3.01–3.15, 4.01–4.15, 6–22

See application file for complete search history.

(56) References Cited

U.S. PATENT DOCUMENTS

| | | | | |
|---|---|---|---|---|
| 4,858,125 | A * | 8/1989 | Washizuka et al. | 600/301 |
| 7,706,212 | B1 | 4/2010 | Campbell | |

(Continued)

FOREIGN PATENT DOCUMENTS

| | | | |
|---|---|---|---|
| DE | 10 2004 032 079 | A1 | 1/2006 |
| DE | 20 2006 008 277 | U1 | 12/2006 |

(Continued)

OTHER PUBLICATIONS

Lakshmaiah, K., et al., "The Ultra Cane," Feb. 10, 2007, pp. 1-12.

(Continued)

*Primary Examiner* — Luke Ratcliffe

(74) *Attorney, Agent, or Firm* — Fish & Richardson P.C.

(57) ABSTRACT

The invention describes an electronic travel aid (ETA) for blind and visually impaired persons implemented in a detachable handle of a white cane. The device enhances the functionality of the white cane giving the user more detailed information about the environment within a defined corridor of interest in front of the user with an extended range of a few meters up to 10 m. It provides a reliable warning if there is a risk of collision with obstacles including those at trunk or head height, which are not recognized by a conventional white cane. Additional sensors are integrated to delimit the defined corridor during the cane sweeping thereby reducing the amount of information that is transmitted to the user via the tactile interface. Alternatively, the device can be used independently from the cane as an object recognition and orientation aid.

26 Claims, 6 Drawing Sheets

(56) References Cited

U.S. PATENT DOCUMENTS

| | | | | |
|---|---|---|---|---|
| 7,755,744 | B1 * | 7/2010 | Leberer | 356/5.1 |
| 2009/0025765 | A1 | 1/2009 | Behm et al. | |
| 2009/0028003 | A1 * | 1/2009 | Behm et al. | 367/116 |

FOREIGN PATENT DOCUMENTS

| | | | |
|---|---|---|---|
| DE | 10 2006 024 340 | B4 | 11/2007 |
| JP | 2008 043598 | A | 2/2008 |
| WO | 2010/142689 | A2 | 12/2010 |

OTHER PUBLICATIONS

Auvray, M., et al., "Learning to perceive with a visuo-auditory substitution system: Localisation and object recognition with the vOICe," Perception London, vol. 36, No. 3, 2007, p. 416.

Benjamin, J. Malverin "The Laser Cane," Bulletin of Prosthetics Research, 1974, pp. 443-450.

Farcy, René et al. in "Laser Telemetry to improve the mobility of blind people: report of the 6 month training course", http://www.lac.u-psud.fr/teletact/publications/rep_tra_2003.pdf, pp. 1-7.

Fujinami, K., et al., "Tactile ground surface indicator widening and its effect on users' detection abilities," Quarterly Report of RTRI, vol. 46, No. 1, 2005, pp. 40-45.

Gallo, Simon, et al. "Augmented White Cane with Multimodal Haptic Feedback," Biomedical Robotics and Biomechatronics (BioRob), 2010, 3rd IEEE RAS and EMBS International Conference Sep. 26-29, 2010, pp. 149-155.

Gallo, Simon "Next generation of white cane", presented at EPFL Oct. 2009 (Simon Gallo, Next generation white cane, Master Thesis, Ecole Polytechnique Fédérale de Lausanne, Jan. 2010), pp. 1-138.

Jacquet, Christophe et al. "A Context-Aware Locomotion Assistance Device for the Blind," People and Computers XVIII—Design for Life, Springer-Verlag, Sep. 2004, pp. 315-328.

MacLean, K., et al., "Do it yourself haptics: Part II interaction design," IEEE Robotics and Automation Magazine, vol. 15, No. 1, 2008, pp. 104-119.

Motor, A. Maxon, "Maxon 2001," Product Catalogue. 2009-2010, 353 pp.

Niwa, M., et al., "Vibrotactile Apparent Movement by DC Motors and Voice-coil Tactors," in Proceedings of the 14th International Conference on Artificial Reality and Ielexistence (ICAT), Seoul, Korea, Citeseer, 2004, pp. 126-131.

Nojima, T. et al., "The SmartTool: A system for augmented reality of haptics," in proceedings of IEEE Virtual Reality, 2002, pp. 67-72.

Oggier, T. et al., "SwissRanger SR3000 and First Experiences based on Miniaturized 3D-TOF Cameras", 1st range imaging research day, Eidgenössische Technische Hochschule Zürich, 2005, pp. 1-12.

Patrick, J. M., "Bodyspace—Anthropometry, Ergonomics and Design," Pheasant's (misc), One Gunpowder Square, London, England EC4A 3DE, 1986, 2 pages.

Sherrick, R, Rogers, Carl E, "Apparent haptic movement," Perception and Psychophysics, vol. 1(6), 1966, pp. 175-180.

Teletact News, Orsay, "Innovations Laser Cane with Sound," Editor Wolfgang Weitlaner, Jul. 21, 2003, one page.

Tversky, B., "Cognitive Maps, Cognitive Collages, and Spatial Mental Models," Spatian Information Theory A Theoretical Basis for GIS, 1993, pp. 14-24.

Velazquez, R., "Contribution à la conception et à la réalisation d'interfàcés tàctilés portable pour les déficients visuéls," 2006, pp. 1-182.

Bolgiano, Ridgely D., et al., "A Laser Cane for the Blind," Quantum Electronics, IEEE Journal of, (vol. 3 , Issue: 6 ), 1967, one page.

International Search Report mailed Sep. 30, 2011 from counterpart International Application No. PCT/US2011/053260, filed on Sep. 26, 2011.

International Preliminary Report on Patentability mailed Mar. 26, 2013 from counterpart International Application No. PCT/US2011/053260, filed on Sep. 26, 2011.

* cited by examiner

WHITE CANE WITH INTEGRATED ELECTRONIC TRAVEL AID USING 3D TOF SENSOR

RELATED APPLICATIONS

This application is a Continuation of International Application No. PCT/US2011/053260, filed on Sep. 26, 2011, now International Publication No. WO 2012/040703, published on Mar. 29, 2012, which International Application claims the benefit under 35 U.S.C. 119(e) of U.S. Provisional Application No. 61/386,190, filed on Sep. 24, 2010, both of which are incorporated herein by reference in their entirety.

BACKGROUND OF THE INVENTION

The white cane is commonly used by the visually impaired as a tool for navigation while on foot. The purpose of the cane is two-fold. First, by moving the cane in a sweeping motion back and forth across the ground, the user gains information about possible obstructions in their path. Second, the white color of the cane alerts fellow pedestrians and motorists to the presence of the user. In addition to a long cane shaft, white canes usually have a handle at one end for gripping the cane and a tip at the other end. A variety of different tip shapes are available.

Electronic travel aids (ETAs) are electronic devices for alerting a user of objects or obstacles in their path as they move through an environment. ETAs are of particular importance in improving the mobility of the visually impaired and are often mounted on white canes. The ETA first detects objects within its detection area and then communicates this information to the user through a haptic interface or some other non-visual form of communication. A haptic interface relays this information by producing tactile feedback, such as vibrations.

Early work on using optical measurement devices as ETAs has been published by J. Malverin Benjamin in "The Laser Cane", Bulletin of Prosthetics Research, pp. 443-450, 1974. The work proposed the use of three laser beams to monitor the downward, forward and upward direction by laser triangulation method. The ETA warns the user with acoustic signals and by actuating a stimulator in contact with the index finger when dropoffs appear in front of the user (downward stairs, edges of station platforms, open manholes, etc.) and when any obstacles appear within a selectable distance range.

In "A Context-Aware Locomotion Assistance Device for the Blind", People and Computers XVIII—Design for Life, September, 2004, pp. 315-328, Springer-Verlag, Christophe Jacquet et al. presented an ETA with an optical detection system. The first device generation named "Tom Pouce" is an infrared proximeter based on several LEDs with collimated beams in different directions and different emission powers. An obstacle in the covered field of view generates back scattered light and, if the photoelectric signal is above a fixed threshold, the device vibrates to alert the blind. Whereas this simplified first generation device is for beginner users, the more advanced second generation device, named "Teletact", is a handheld laser telemeter with two user interfaces: a tactile and a sonorous one. The tactile interface has two vibrating elements for two fingers for a distance of up to 6 meters. The sonorous interface is for a distance of up to 15 meters and the distance information is coded in 28 different musical notes so that during scanning the obstacle profile is relayed as a melody. The obstacle distance is determined by the laser beam spot size on the object measured with a CCD image sensor line. For this advanced device, a 6 month training course is intended, as reported by Rene Facry et al. in "Laser Telemetry to improve the mobility of blind people: report of the 6 month training course", http://www.lac.u-psud.fr/teletact/publications/rep_tra_2003.pdf. The "Tom Pouce" device tries to estimate depth simply by looking at the reflected intensity, whereas the "Teletact" device actually measures the distance by triangulation.

The Laser Long Cane device commercialized by Vistac GmbH, Germany (http://www.vistac.com/) is an ETA in a white cane for detecting obstacles at trunk and head level in front of a user, which are not detected by the conventional long cane. It is based on an infrared laser ranging detection system that measures the object distance. The laser beam faces forward and upward in direction and the distance range is adjustable in a range of 120 up to 160 cm. If an obstacle in this range at trunk or head level appears in front of the user, a vibration of the entire cane handle is generated.

Several state-of-the-art commercial handheld ETAs are based on ultrasonic detection systems. Examples include Ultracane from Sound Foresight Technology Limited, UK (http://www.ultracane.com/) and Ray from CareTec, Austria, with acoustic and haptic interfaces for alerting the user when obstacles in a range of 1.5 m up to 3 m are detected.

A device for guiding the blind is described by Sebastian Ritzler in the German patent application DE 10 2006 024 340 B4. The device has an ultrasonic sensor or a camera detection system integrated in the handle of a white cane and at the cane's tip is a power driven wheel for guiding the user around obstacles. The wheel is power driven only in the case of an unobstructed path. The device guides the user with the driven wheel but does not to give feedback on his surroundings therefore removing the original functionality of the white cane.

A further idea for a handheld ETA with a camera or 3D sensor detection system and a haptic interface is described by T. Leberer, Scylab GmbH in the patent application DE 10 2004 032 079 A1. The haptic interface consists of one or several lines of movable tracer pins, which are electronically actuated for transferring the image data to the user.

In his thesis work "Next generation of white cane", Simon Gallo presented at EPFL 2009-10 (Simon Gallo, Next generation white cane, Master Thesis, Ecole Polytechnique Fédérale de Lausanne, January 2010) a white cane with different types of sensors and haptic feedback (vibrotactile and mechanical shocks). Specifically as range sensors, he mentions ultrasonic sensors, triangulation sensors and single point time-of-flight laser sensors.

SUMMARY OF THE INVENTION

A major challenge of ETAs is obtaining detailed and accurate information regarding the distance to objects over a broad field-of-view and conveying that information to a user. Older embodiments, such as those relying on ultrasonic technology, are limited in the spatial and/or depth information they provide. Such information could be provided from a time of flight (TOF) sensor. Only the thesis work of Simon Gallo presents a white cane with a TOF sensor, however.

Furthermore, other devices mentioned, such as the cane in DE 10 2006 024 340 B4 and the handheld ETA of DE 10 2004 032 079 A1 do not successfully combine the functionality of a white cane with an ETA device.

The device presented herein preferably concerns an ETA for improved mobility of blind and visually impaired persons that is integrated in a white cane. The ETA includes a time-of-flight (TOF) sensor, an evaluation unit and a haptic interface for transferring the depth image information to the user in an intuitive way.

The ETA device is based on a TOF sensor capable of measuring the distance from objects in a scene to each pixel of a pixel array of the sensor. This advanced imaging technology results in enhanced positional information of the objects and thereby provides more functionalities than other existing electronic travel aids. For simplifying the image information and for easier handling of this ETA, the field-of-view of the TOF sensor can be adjusted to include only the important part of the scene in a vertical fan shape. The direction of the vertical image cut-out is determined by the user through the orientation or scanning motion of the white cane.

The time-of-flight (TOF) approach is a well-known way to acquire depth information about the surrounding environment. One of the first commercially available TOF sensors was described by T. Oggier et al., "SwissRanger SR3000 and first experiences based on miniaturized 3D-TOF Cameras", 1st range imaging research day, Eidgenossische Technische Hochschule Zurich, 2005. Modulated light is emitted by the light source. A control unit controls the modulation of the light as well as the demodulation of the imager with appropriate modulation controlling signals. The emitted light is reflected by the target in the field-of-view, and a lens system (possibly including optical filters) projects the modulated light onto the demodulation imager, which includes an array of pixels. So-called time-of-flight (TOF) detectors currently contain up to 1 Mpixels. By applying appropriate synchronous sampling to each of the pixels of the imager, distance is derived based on the travel time of the emitted light from the sensor to the object and back.

For transfer of the TOF image information to the user a discrete haptic interface is integrated in the handle of the white cane. The haptic interface is realized in a line or matrix of vibro-tactile elements. Pin or Braille displays can also be used. The haptic interface directly reflects the image information and object distance information e.g. by variable height profiles, variable vibration, vibration intensity, electrotactile stimulation, different haptic rhythms or interstimuli duration. For the data of the fan-shaped pixel lines, a corresponding line of tactile elements is used as a very intuitive and direct way to transfer the information to the user.

Additional auxiliary sensors, such as orientation and motion sensors, are optionally combined with the TOF sensor to track the oscillating motion of the white cane during locomotion and to determine the travel direction. The travel direction is then selected as the important area of the scene, allowing the user to detect obstacles in this area while the device disregards obstacle information from other areas that would be confusing and disturbing for the user.

The disclosed device is helpful in many different daily situations for blind and visually impaired users, allowing them to better explore the environment by detecting and even recognizing objects. The first benefit is the use of the ETA with the white cane for travelling in unknown environments by detecting objects or obstacles in an extended distance range of several meters. This allows the user to avoid painful and dangerous collisions with obstacles at the head or trunk level as well as obstacles or drop-offs at some distance, which are not recognized with a conventional white cane. A second benefit is the use of the device for scanning the environment to find and recognize objects or to find passage ways, open doors, stairs, as well as entrances or exits of buildings. The ETA is completely integrated in the handle and is removable from the white cane body, allowing use of the ETA without the cane body in environments such as buildings, where the use of a white cane is not practicable.

In general, according to one aspect, the invention features a cane system, comprising a TOF sensor generating object distance and range information, an auxiliary sensor system that generates sensor data, a haptic interface to a user, and an evaluation unit that receives the distance and range information and the sensor data and generates tactile feedback to the user via the haptic interface.

In general, according to another aspect, the invention features a cane system, comprising a cane, a detachable cane handle, and an electronic travel aid system mounted on the cane handle, the electronic travel aid system comprising a TOF sensor generating distance and range information, a haptic interface to a user, and an evaluation unit that receives the distance and range information and generates tactile feedback to the user via the haptic interface.

In general, according to still another aspect, the invention features a cane system, comprising a cane with a handle, an electronic travel aid system mounted on the cane, the electronic travel aid system comprising, a TOF sensor generating distance and range information, a haptic interface to a user comprising a plurality of tactile feedback rings extending around the cane handle, and an evaluation unit that receives the distance and range information and generates tactile feedback to the user via the haptic interface.

In general, according to still another aspect, the invention features a cane system, comprising a cane, a cane handle, wherein an axis of the cane handle is different from an axis of the cane, and an electronic travel aid system mounted on the cane handle, the electronic travel aid system comprising a TOF sensor generating distance and range information, a haptic interface to a user, and an evaluation unit that receives the distance and range information and generates tactile feedback to the user via the haptic interface.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The present invention features a white cane with an electronic travel aid (ETA). The ETA includes a modulated light-based, time-of-flight (TOF) sensor, an evaluation unit and a haptic interface. The depth measurements from the TOF sensor are evaluated by the evaluation unit, which controls the haptic interface to the user. The haptic feedback from the haptic interface is designed such that the user receives the most valuable information out of the data acquired by the TOF sensor. The most valuable information might be a depth profile of the environment, information regarding the closest object, or more sophisticated data such as stairs, doors, free passages, etc.

Figure 1:
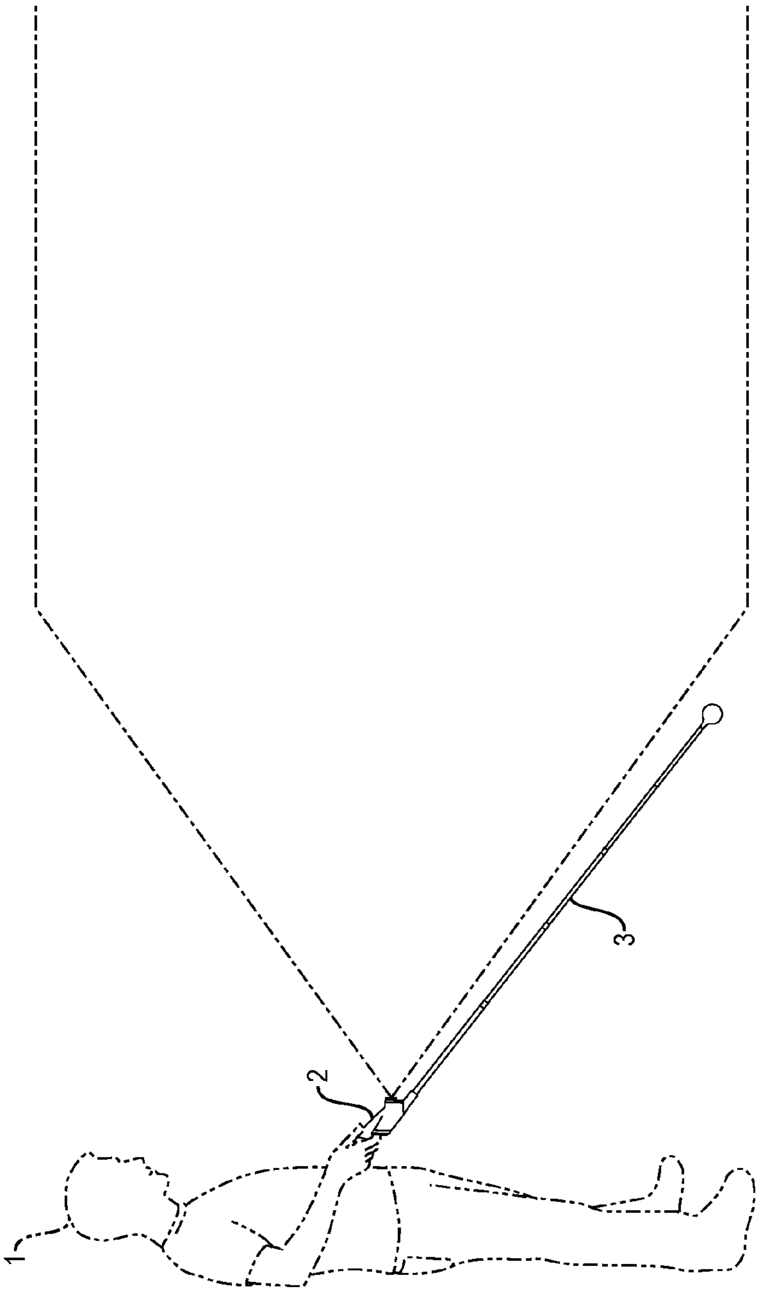
FIG. 1 shows a visually impaired or a blind person using the white cane with the electronic travel aid.

The use of the device is shown in FIG. 1. An ETA is mounted on cane handle 2 of a white cane 3. As a user 1 grips the cane handle, allowing the tip of the cane to rest on the ground, the ETA is positioned so that it detects the distance to objects within a field-of-view in front of the user. The ETA then transmits this information to the user through the haptic interface.

Figure 2:
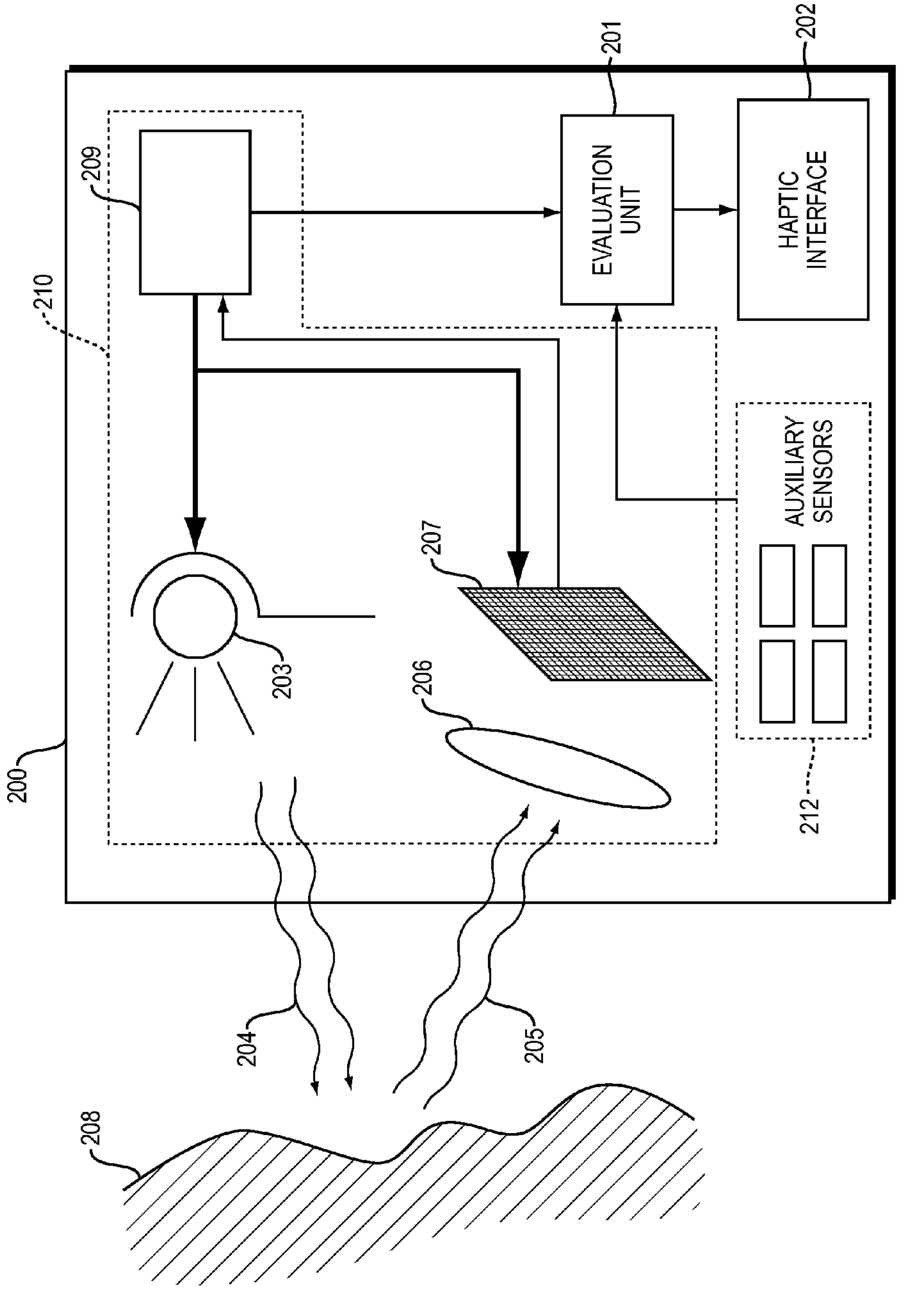
FIG. 2 shows a basic block diagram of the electronic travel aid.

The ETA is described in more detail in FIG. 2. The ETA 200 includes a time-of-flight (TOF) sensor 210, an evaluation unit 201 and a haptic interface 202 for transferring the depth image information to the user.

The TOF sensor 210 includes a light source 203 to emit modulated light 204. An optical system 206 with or without optical filters, images reflected light 205 onto a TOF pixel array 207 from a surface 208 in the field-of-view. A control unit 209 generates depth information from the measured sampling data of the TOF sensor 210 and also controls the modulation of the light source and operation of the pixel array 207 in order to provide for synchronous sampling.

The evaluation unit 201 receives the acquired depth data, performs image and data processing and transfers the most appropriate information to the user via haptic interface 202.

The ETA 200 is optionally further extended by auxiliary orientation and motion sensors 212, including a gyroscope, a global positioning system (GPS), compass, and acceleration sensors. Additional auxiliary sensors 212 enable the measurement of other relevant information including cane orientation during locomotion and cane sweeping or walking corridor definition, which the evaluation unit 201 uses to interpret different scenarios.

With the auxiliary sensors 212, a monitored travel direction corridor in front of the user is defined by the evaluation unit 201. This reduces the amount of transferred information to user by ignoring the non-relevant image data outside this monitored corridor. The environment is scanned with the ETA 200 and the user selects and controls the desired information from the scene by moving the device or sweeping the white cane 3.

In some embodiments, the image acquisition of the TOF sensor 210 is triggered in response to the information received by the auxiliary sensors 212 including the accelerometer, global positioning system, compass and gyroscope. By doing so, the direction of the device while the person is walking and sweeping the cane is determined and the TOF sensor 210 is triggered by the forward directed cane position.

Preferably, the ETA 200 includes an on/off button. This enables power savings during non-use of the device and avoids unwanted haptic feedback.

Figure 3:
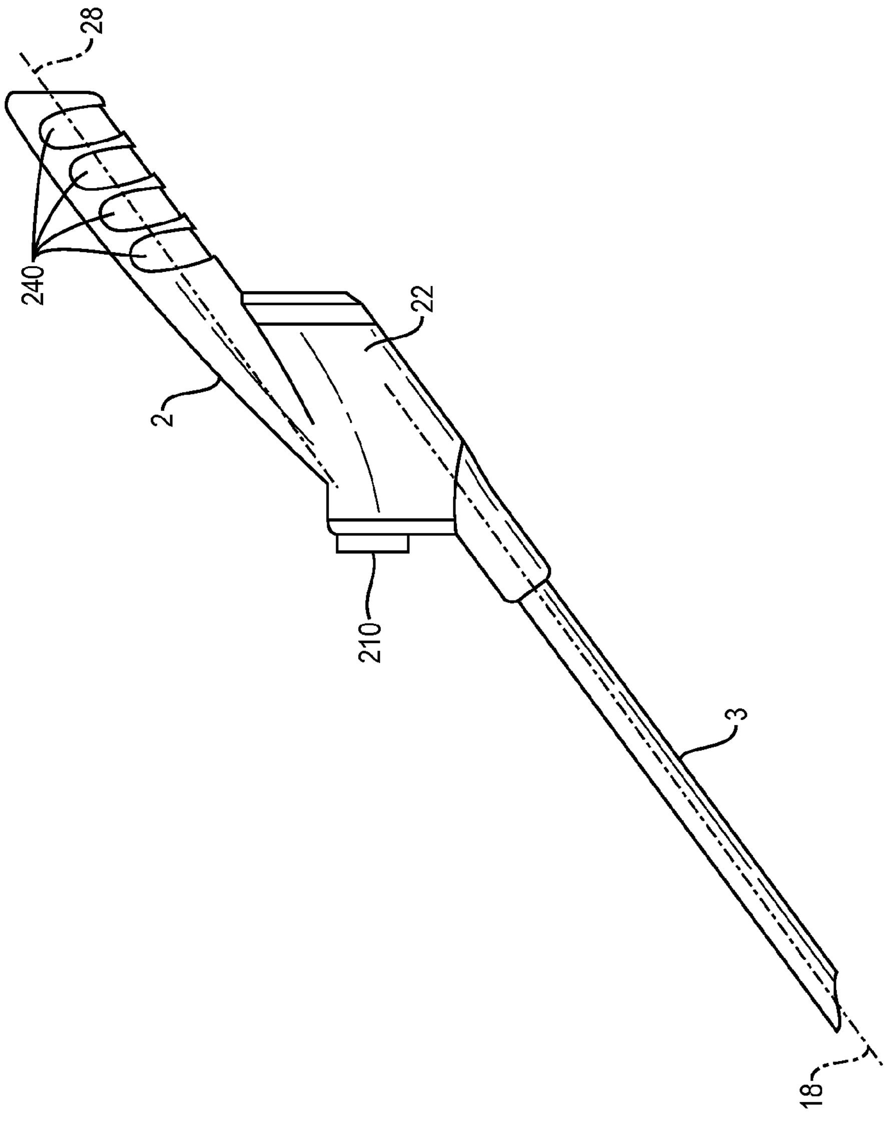
FIG. 3 shows the electronic travel aid (ETA) mounted on a cane.

A preferred embodiment of the device is illustrated in FIG. 3. A white cane 3 includes a removable cane handle 2. The cane handle 2 comprises a housing 22 containing ETA 200. The ETA 200 is preferably integrated in the cane handle 2 of the white cane 3 and mountable for use with various white canes, but can alternatively also be used without the white cane 3. Preferably, the device is powered by a battery pack contained in the housing 22.

The distance information gathered by the TOF sensor 210 is communicated to the user through the haptic interface 202 positioned on or in cane handle 2. The haptic interface 202 is designed based on tactile elements arranged in a line or matrix. The tactile elements are either quasi-static (user explores updated positions of tactile elements by touch), for example a Braille display wherein Braille display pins are arranged into a linear or matrix display, vibrators vibrating at a given frequency when powered, or pulse tactile elements able to produce single pulses. Pulse tactile elements may be driven such that single pulses, rhythms, vibrations, or patterns are perceived by the blind.

In certain embodiments, the haptic feedback is rendered using transfer functions, i.e. depth information is translated into spatial pin profiles, rhythms, vibration intensities, pulses, etc. following certain transfer functions. From this information, the user deduces the object being sensed by the TOF sensor 210.

In one example, the haptic feedback is communicated to the user via predefined tactile patterns. Depth information, situations, objects, obstacles, alerts, etc. are coded and fed to the haptic interface 202 in a well-defined manner. This requires that image data analysis beyond data reduction is done by the evaluation unit 201.

In further aspects, the haptic feedback is rendered in a semi-intuitive way, meaning that coded information as well as intuitive information is displayed by the haptic interface 202 and/or that image processing is carried out by the evaluation unit 201 and/or the user. For example, the obstacle most likely to be run into by the user would be displayed. This would include certain image processing—detection of the nearest obstacle in the walking direction—and an intuitive distance and position rendering.

A preferred embodiment includes positioning the haptic interface 202 on the white cane handle 2 such that the tactile feedback is not limited to a small specific area on the cane handle 2, but such that the user can grip the cane handle 2 in almost any possible way and still feel the haptic feedback. This is achieved by having tactile elements placed in rings, part-rings or half-rings around the cane handle 2.

FIG. 3 shows a design with four haptic elements 240, each of them having a ring form extending around the handle 2, and therefore, giving maximum flexibility to the person holding the cane handle 2. Such a ring-shaped haptic feedback design enables the user to feel the tactile information in almost any position in which the cane handle 2 is held.

Besides conveying the information displayed by haptic interface 202, which renders the information generated by the different sensory parts of the device, the cane itself still fulfills its function as a haptic device displaying information gathered from the floor. Therefore it is crucial to keep the different haptic information separate by isolating the vibrations among the haptic elements 240 as well as between the haptic elements 240 and the rest of the white cane 3 with respect to the grip. Each haptic element 240 is therefore separately suspended within the cane grip with an element or elements acting as a spring damper. The design of these suspensions is preferably such that neither the vibrations nor the damping effect is stopped by the user's grip.

In some embodiments, the above described suspensions are implemented as "half rings" holding the haptic elements 240 and attached to the cane's grip through meander like structures. The meander structure acts as a spring damper and allows movement in the plane of the half ring. Moreover the half ring is implemented such that the vibration is carried to the user's finger through as large a surface as possible. The thickness of the half ring or rather the opening in the grip is less than the diameter of the users' fingers. Otherwise, gripping by the user might prevent vibration.

FIG. 3 further shows an embodiment with an off-axis design. In this embodiment the person holds the white cane 3 and ETA 200 device in the correct position with respect to the field-of-view of the TOF sensor 210. This is done with appropriate handling design, or as shown in FIG. 3, by an off-axis construction. The axis 28 of the cane handle 2 does not correspond to the axis 18 of the white cane 3. Due to gravity, the cane self-adjusts the ETA's viewing direction. In the preferred embodiment, the axis 28 of the cane handle 2 is parallel to the axis 18 of the white cane 3.

In another embodiment of the white cane 3 with the TOF sensor 210, the haptic interface 202, the evaluation unit 201 and the power supply are embedded in the cane handle 2 with the full cane handle 2 being replaceable and mountable. Since the white cane 3 may wear or break, the broken low-cost cane body can easily be replaced and the expensive cane handle 2 can be kept.

Figure 4:
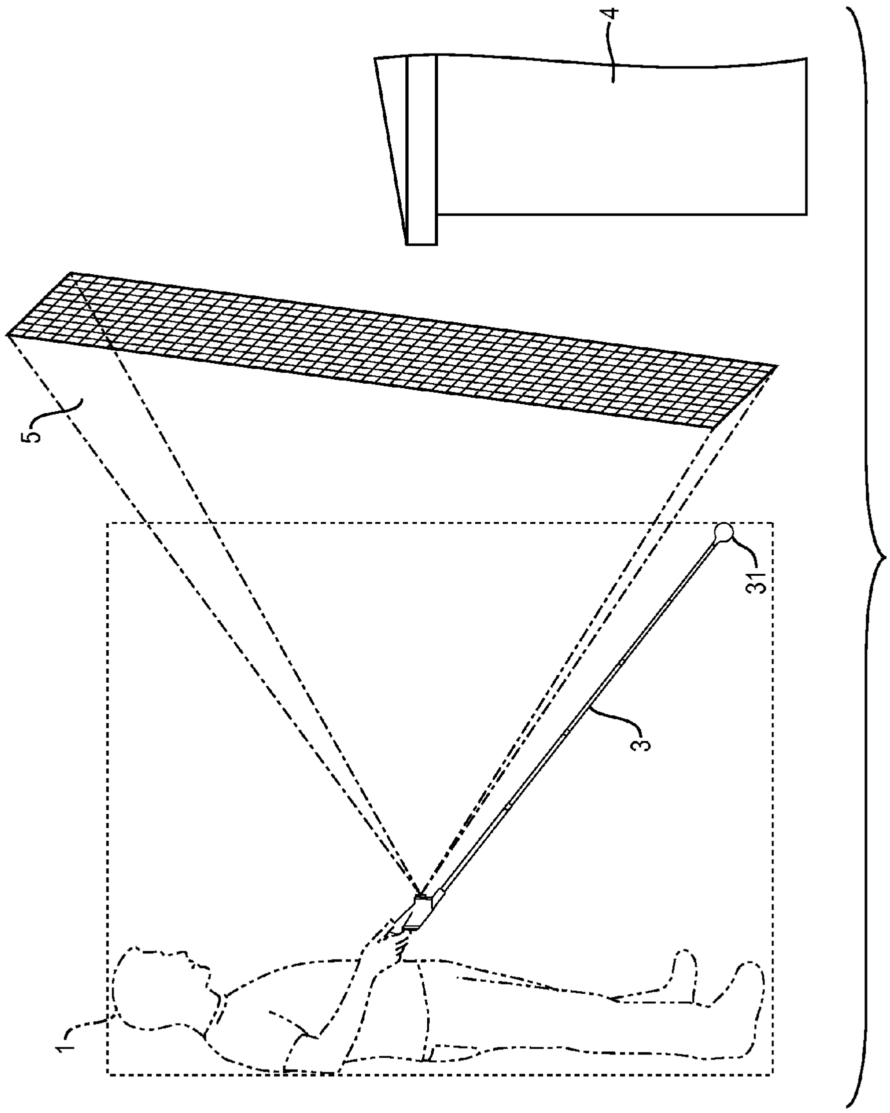
FIG. 4 shows the visually impaired or blind person using the white cane with the ETA to generate a fan-shaped field-of-view.

Another aspect is shown in FIG. 4. This relies on limiting the field-of-view of the TOF sensor 210 to a fan-shaped field-of-view 5 rather than using a full field-of-view. In many cases, the user does not need information from all directions, but mainly from the walking direction. This is achieved by using only a vertically fan-shaped field-of-view 5 of the TOF sensor 210 and enables power efficient control of the ETA 200.

As shown in FIG. 4, the TOF sensor 210 only captures an array of vertical fan-shaped fields-of-view 5 and passes the acquired depth array to a control unit 209. The reduction of the field-of-view 5 to a vertical fan-shaped area has the advantage that the acquired data are reduced early on, making the processing simpler. Furthermore, having a reduced field-of-view 5 enables a reduction of the illumination since the control unit 209 can shut down the sensor 210 when it is pointed outside the field of view 5. The illumination unit 203 of the TOF sensor 210 is the most power consuming part of the operation of the ETA 200. Hence, reducing the illumination reduces power supply challenges of the mobile device. Having a fan-shaped field-of-view 5, the person can still "scan" his full surroundings by swiping the cane.

Figure 5:
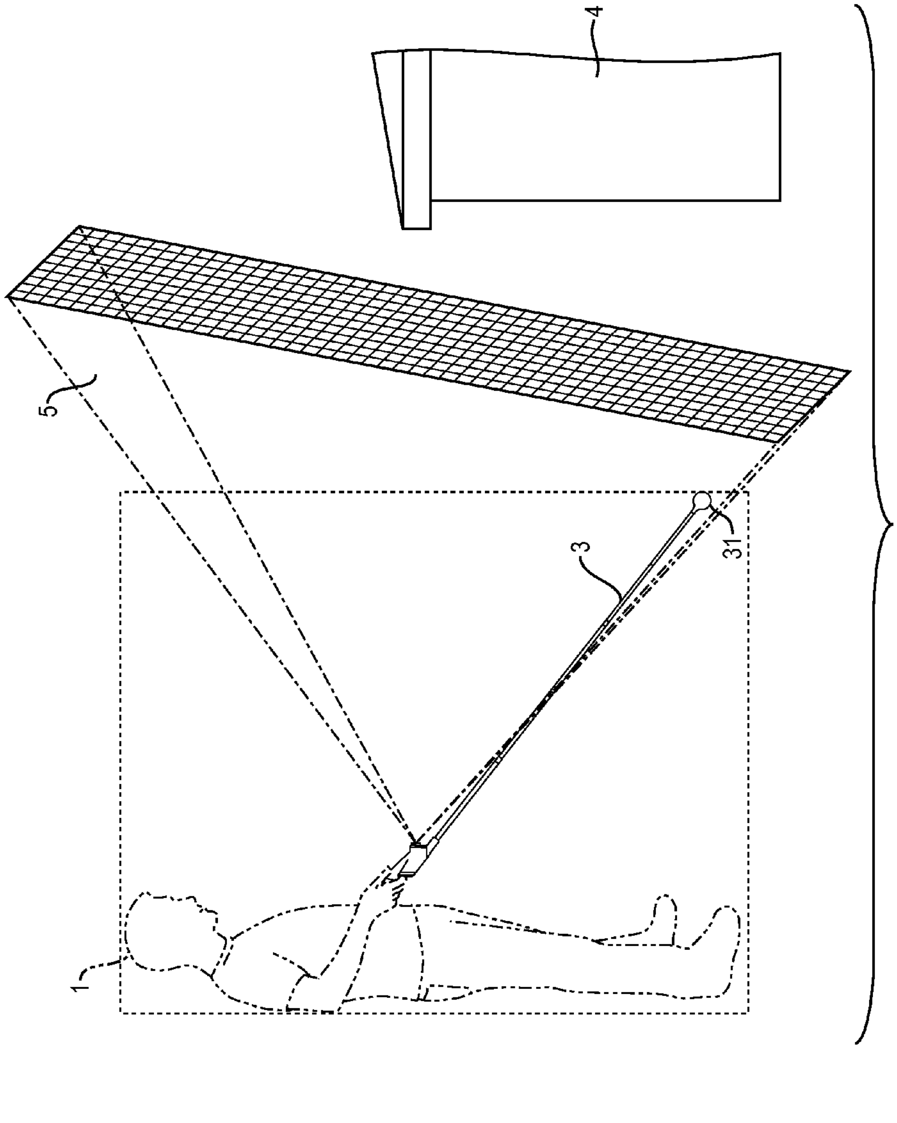
FIG. 5 shows the visually impaired or blind person using the white cane with the ETA to generate a fan-shaped field-of-view wherein the tip of the cane is inside the field-of-view of the ETA device.

FIG. 5 shows an embodiment where the field-of-view 5 of the TOF sensor 210 covers the tip 31 of the white cane 3. The measurement of the position of the tip of the white cane 3 is used to improve algorithms, e.g. to determine the ground or for depth sensing calibration purposes.

In another embodiment, the information from the captured fan-shaped field-of-view 5 of the TOF sensor 210 is further reduced to different areas of interest, e.g. a head area, an upper body area, a lower body area and the ground. Based on this information reduction, an appropriate haptic feedback informs the user about the depth and position of an obstacle 4. This intelligent segmenting of the area is preferably performed by the evaluation unit 201.

Figure 6A:
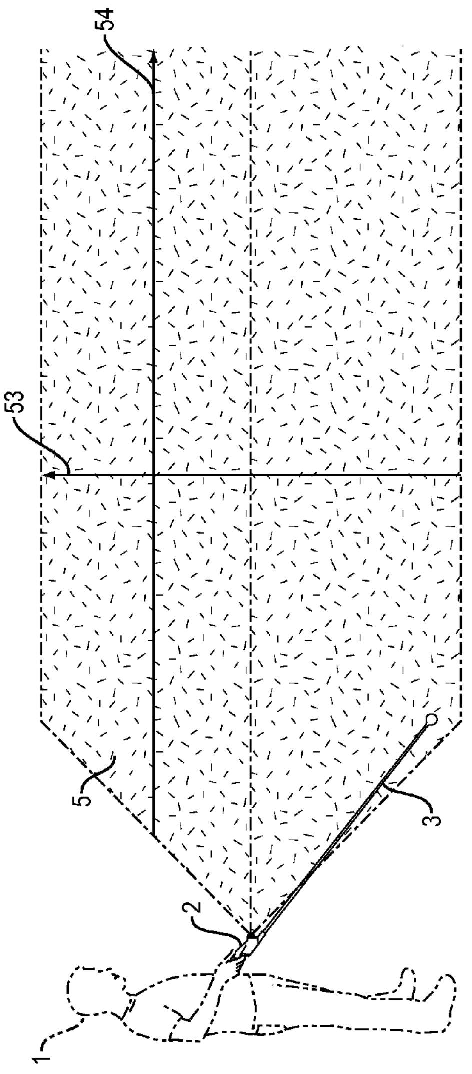
FIGS. 6A and 6B illustrate a possible definition of a corridor in walking direction of the person.
Figure 6B:
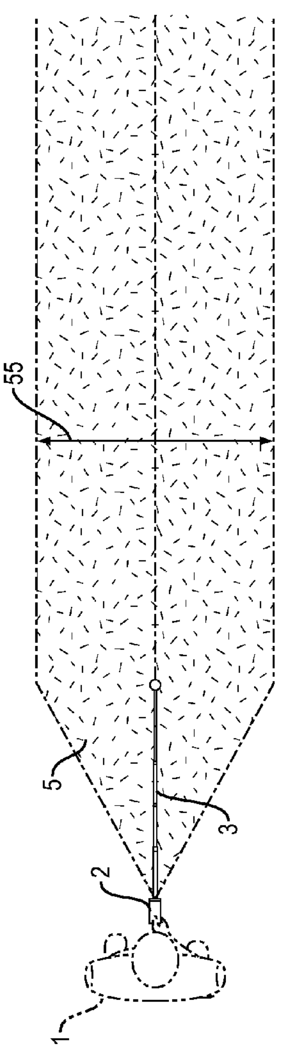

FIGS. 6A and 6B illustrate the definition of a corridor within the monitored field of view of the TOF sensor 210 for selecting the important image information in the region of interest in the walking direction for information transfer to the user. The height limitation 53 is seen in the side view sketch (FIG. 6A) and the width limitation 55 is given in the top view (FIG. 6B). The depth limit 54 of the defined corridor is illustrated in both representations. This reduces the transferred information and avoids disturbing warnings if objects are beside the walking path or above the head level, which is not important for users.

In an aspect, the ETA 200 includes a button giving the user the ability to choose between operation modes, such as a walking mode with a predefined corridor or a scanning mode to acquire as much information as possible. Other modes include guiding mode, searching mode or other functional modes of operation integrating further techniques, e.g. GPS or object recognition by image processing.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cane system, comprising:

a TOF sensor generating object distance and range information, a portion of a field of view of the TOF sensor including at least a portion of a cane of the cane system;

an auxiliary sensor system that generates sensor data;

a haptic interface to a user; and an evaluation unit that receives the distance and range information and the sensor data and generates tactile feedback to the user via the haptic interface, wherein the portion of the cane in the field of view of the TOF sensor is used for calibration.

2. The system of claim 1, wherein the system is mounted on the cane.

3. The system of claim 1, wherein the auxiliary sensor system comprises a global positioning system.

4. The system of claim 1, wherein the auxiliary sensor system comprises a compass.

5. The system of claim 1, wherein the auxiliary sensor system comprises an accelerometer.

6. The system of claim 1, wherein the auxiliary sensor system comprises a gyroscope.

7. The system of claim 1, wherein activation of the TOF sensor is regulated by the auxiliary sensor system.

8. A cane system, comprising:

a cane;

a detachable cane handle; and an electronic travel aid system mounted on the cane handle, the electronic travel aid system comprising:

a TOF sensor generating distance and range information, a portion of a field of view of the TOF sensor including at least a portion of the cane;

a haptic interface to a user; and an evaluation unit that receives the distance and range information and generates tactile feedback to the user via the haptic interface.

9. The system of claim 8, wherein the TOF sensor has a vertical fan-shaped field-of-view.

10. The system of claim 8, wherein the electronic travel aid system is embedded in the cane handle.

11. The system of claim 8, further comprising a battery pack.

12. The system of claim 8, wherein the haptic interface comprises tactile feedback rings around the cane handle.

13. The system of claim 12, wherein the tactile feedback rings are complete rings or partial rings.

14. The system of claim 8, further comprising a power switch that controls power to the electronic travel aid.

15. The system of claim 8, wherein the haptic interface comprises at least two separated tactile elements.

16. The system of claim 15, wherein the tactile elements are vibro-tactile, pulse-tactile or movable Braille pins.

17. The system of claim 16, wherein the tactile elements are elements arranged in a line.

18. The system of claim 16, wherein the tactile elements are elements arranged in a matrix.

19. The system of claim 8, wherein the cane and cane handle have parallel axes.

20. The system of claim 8, wherein the TOF sensor comprises a light source for emitting modulated light, an optical system, a TOF pixel array and a control unit.

21. The system of claim 8, wherein the distance and range information generated by the TOF sensor is communicated to the user via pre-defined tactile patterns.

22. The system of claim 8, wherein the ETA further comprises a selector for selecting between modes of operation.

23. A cane system, comprising:

a cane with a handle; and an electronic travel aid system mounted on the cane, the electronic travel aid system comprising:

a TOF sensor generating distance and range information, a portion of a field of view of the TOF sensor including at least a portion of a cane of the cane system;

a haptic interface to a user comprising a plurality of tactile feedback rings extending around the cane handle; and an evaluation unit that receives the distance and range information and generates tactile feedback to the user via the haptic interface.

24. The system of claim 23, wherein the tactile feedback rings are complete rings or partial rings.

25. A cane system, comprising:

a cane;

a cane handle, wherein an axis of the cane handle is different from an axis of the cane; and an electronic travel aid system mounted on the cane handle, the electronic travel aid system comprising:

a TOF sensor generating distance and range information, a portion of a field of view of the TOF sensor including at least a portion of a cane of the cane system;

a haptic interface to a user; and an evaluation unit that receives the distance and range information and generates tactile feedback to the user via the haptic interface.

26. The system of claim 25, wherein the cane and cane handle have parallel axes.

* * * * *